United States Patent
Khullar et al.

(10) Patent No.: US 12,032,568 B2
(45) Date of Patent: Jul. 9, 2024

(54) MULTI-LAYER EXTENSIBILITY FOR ENTERPRISE PORTAL

(71) Applicant: SAP SE, Walldorf (DE)

(72) Inventors: Vipul Khullar, New Delhi (IN); Akansha Tiwari, Gurgaon (IN); Shreya Sinha, Bihar (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/947,760

(22) Filed: Sep. 19, 2022

(65) Prior Publication Data

US 2024/0095239 A1    Mar. 21, 2024

(51) Int. Cl.
*G06F 17/00* (2019.01)
*G06F 11/34* (2006.01)
*G06F 16/242* (2019.01)
*G06F 16/25* (2019.01)

(52) U.S. Cl.
CPC ...... *G06F 16/2448* (2019.01); *G06F 11/3457* (2013.01); *G06F 16/256* (2019.01)

(58) Field of Classification Search
CPC . G06F 16/2448; G06F 16/256; G06F 11/3457
See application file for complete search history.

(56) References Cited

U.S. PATENT DOCUMENTS

| | | | |
|---|---|---|---|
| 7,984,417 B2 * | 7/2011 | Ben-Zvi | G06F 8/10 717/113 |
| 11,314,611 B2 * | 4/2022 | Peddibhotla | G06F 21/604 |
| 2016/0314202 A1 * | 10/2016 | Gomadam | G06F 16/9024 |
| 2022/0100748 A1 * | 3/2022 | Ananthamurthy | G06F 16/258 |

OTHER PUBLICATIONS

Mark Ginsburg. The catacomb project: building a user-centered portal the conversational way. In Proceedings of the 4th international workshop on Web information and data management (WIDM '02). Association for Computing Machinery, 84-87. < https://doi.org/10.1145/584931.584949>, Nov. 2002.*

Ahmed Helal, Mossad Helali, Khaled Ammar, and Essam Mansour. A demonstration of KGLac: a data discovery and enrichment platform for data science. Proc. VLDB Endow. 14, 12, 2675-2678. <https://doi.org/10.14778/3476311.3476317>, Jul. 2021.*

* cited by examiner

*Primary Examiner* — Greta L Robinson
(74) *Attorney, Agent, or Firm* — Buckley, Maschoff & Talwalkar LLC

(57) ABSTRACT

Some embodiments may be associated with facilitating extensibility for an enterprise portal in a cloud computing environment. A computer processor of a multi-level extensibility framework server may provide to a user a graphical view of existing services of the enterprise portal using information from the business enterprise portal data store and a sample data model. The processor may also receive from the user extension information for at least one of the technical layers and, based on the received extension information, automatically generate and provide an intelligent extension proposal to the user. The processor may also display simulated results to the user based on the intelligent extension proposal and the sample data model. The processor may then receive from the user a confirmation of the intelligent extension proposal and automatically transfer extension fields, entities, and mapping to multiple technical layers of the enterprise portal.

19 Claims, 25 Drawing Sheets

```
        viewTypec #TRANSACTIONAL,
        lifecycle.contract.type: #INTERNAL API
}                                                                    ⌐ 1410
@AccessControl.personalData.blocking: #REQUIRED
@AccessControl.authorizationCheck: #CHECK
@EndUserText.label: "Transaction Processing View : Trading Contract Header"
define root view entity R_ACMTrdgContrHdrTP
        as select from I_ACMTrdgcontrHdr
        composition [*] of R_ACMTrdgContrItmDetTP          as _ContractItem
        composition [*] R_ACMTrdgContrHdrFeeDetsTP         as _ContractHeaderFee
        composition [*] of R_ACMTrdgContrHdrTextDetTP      as _ContractHeaderText
{
        key    TradingContractNumber,
               ContractStatus,
               ACHContractCategory,
               ACMTrdgContrStatusCategory,
               Side,
               TradingContractCurrency,
               ACMTradinRContractCategory,
               TradingContractExternalID,
               SalesOrganization,
               DistributionChannel,
               Division,
               PurchasingOrganization,                         ⊢ 1420
               PurchasingGroup,
               DocumentDate,
               TradingContractCreatedBy,
               TradingContractChangedBy,
               TradingControctChangedOnDate,
               ACMAmendingTraderID,
               ACMOriginalTraderID,
               CounterParty,
               Incoterms,
```

```
@OData.entityType.name: "TradingContract_Type"
@ObjectModel:    {
                    usageType: {                    ⎯ 1510
                        dataClass: #TRANSACTIONAL
                        serviceQuality: #C,
                        sizeCategory: #L
                    }
}
@VDM: {
    viewType : #CONSUMPTION,
    lifecycle.contract.type: #PUBLIC_REMOTE_API
    usage.type: [#TRANSACTIONAL_PROCESSING_SERVICE]
}
@EndUserText. label: "Contract Header"
@AccessControl.authorizationCheck: #CHECK
define root view entity A_ACMTrdgContractOverview provider contract transactional_query
as projection on R_ACMTrdgContrHdrTP
{
        key    TradingContractType,
               ContractStatus,
               ACMContractCategory,
               ACMTrdgContrStatusCategory,
               Side,
               TradingContractCurrency,
               ACMTradingContractCategory,      ⎯ 1520
               TradingContractExternalIO,
               SalesOrganization,
               DistributionChannel,
               Division,
               PurchasingOrganization,
               PurchasingGroup,
               DocumentDate,
```

*FIG. 15*

ContractsMappings.xsit　　　← 1600

```
<Xsl:template match="/">         ← 1610
    <xsl:variable name="Lines" select="//Element[_ContractItem != " ")
                            |
                            //Element/_ContractHeader[_ContractItem ! = ' '] "/ >
    <TradingContractHeaders>
        <xsl:for-each select="$Lines">
            <TradingcontractHeader>
                <sourceSystemId>
                    <xsl:value-of select="$SSID"/>
                </sourceSystemId>
                <tradingContractNumber>
                    <xsl:value-of select="TradingContractNumber"/>
                </tradingContractNumber>
                <tradingContractStatusId>
                    <xsl:value-of select="ContractStatus"/>
                </tradingContractStatusId>
                <tradingContractExternalId>
                    <xsl:value-of select="TradingContractExternalID"/>
                </tradingContractExternalId>
                <amendingTraderId>
                    <xsl:value-of select="ACMAmendingTraderID"/>
                </amendingTraderId>
                <originalTraderId>
                    <xsl:value-of select="ACMOriginalTraderID"/>
                </originalTraderId>
                <counterPartyId>
                    <xsl:value-of select="CounterParty"/>
                </counterPartyId>
                <incotermId>
                    <xsl:value-of select="Incoterms"/>
                </incotermId>
```

```
using {sap.acm.fp.type.ActiveStatus} from '../type/Activestatus';
using {sap.acm.fp.config.SourceSystem} from '.../config/SourceSystem';
using {sap.acm.fp.config.BusinessPartnerUser} from '.../config/BusinessPartnerUser'; @cds.odata.valuelist
entity TradingContractHeader : AdminData {                                                                    ⎯1700
  key  sourceSystemId                : string(10)   @title : '{i18n>sourceSystemId}';
  key  tradingContractNumber         : string(50)   @title : '{i18n>Contract}';
       companyId                     : string(50)   @title : '{i18n>Companyid}';
       counterPartyId                : string(50)   @title : '{i18n>BusinessPartner}' @JI.HiddenFilter;
       originalTraderId              : string(12)   @title : '{i18n>TraderId}';
       amendingTraderId              : string(12)   @title : '{i18n>AmendingTraderId}';
       tradingContractExternalId     : string(30)   @title : '{i18n>TradingContractExternalIdentifier}' @UI.HiddenFilter;
       tradingContractCreditSales    : ActiveStat   @title : '{i18n>CreditSale}';
       signedStatus:                   ActiveStat   @title : '{i18n>SignedStatus}';                           ⎯1710
       PaymentTermId                 : string(4)    @title : '{i18n>PaymentTerm}' @UI.HiddenFilter;
       incotermId                    : string(3)    @title : '{i18n>Incoterm}';
       incotermsLocation             : string(70)   @title : '{i18n>IncotermLocation}' @UI.HiddenFilter;
       tradingContractStatusId       : string(1)    @title : '{i18n>Status}';
       tradingContractTypeId         : string(4)    @title : '{i18n>Type}';
       documentDate                  : Date         @title : '{i18n>documentDate}';
       tradingContractCategory       : string(1)    @title : '{i18n>tradingContractCategory}';
       validTo                       : Date         @title : '{i18n>ValidTo}';
       currency                      : string(5)    @title : '{i18n>currency}';

sourceSystem                  :Association to SourceSystem
```

FIG. 17

```
        SearchRestrictions : {                                  ┌─ 1900
                $Type       :       'Capabilities.SearchRestrictionsType', false
                Searchable  :       false
        }
}
annotate service.contractrtemQuantity with {        ┌─ 1910
        tradingContractNumber   @Common : {
                Text            :       tradingContractNumber,
                TextArrangement :       #TextOnly,
                ValueList       : {
                        $Type           :       'Common.ValueListType',
                        Label           :       '{i18n>ContractNumber}',
                        CollectionPath  :       'TradingContractHeaderVH',
                        Parameters      :       [{
                                $Type                   : 'common.ValueListParameterInOut', LocalDataProperty       : tradingcontractNumber,
                                ValuesListProperty      : 'tradingcontractNumber'
                        }]
                }
        };

materialId      @Common : {
                Text    : materialDescription,
```

*FIG. 19*

MANAGE CONTRACTS - Standard

Contract Number: [ ]  Delivery Period: [ ]  Material: [ ]

Contract State: [ ]  Status: [ ]  Commodity: [ ]

2010

Contract (10)

| Contract/Item | Delivery Period | Material | Commodity | Incoterms | Paid Quantity |
|---|---|---|---|---|---|
| ☐ 12345/20 | July 1, 2024 to July 30, 2024 | CO_SOYBEANS_02 | Soybeans | DDP | 0.00 BU |
| ☐ 54321/10 | July 7, 2024 to July 14, 2024 | CO_WHEAT_01 | Feed Wheat | DDP | 0.00 BU |
| ☐ 98765/10 | June 14, 2024 to July 14, 2024 | CO_SOYBEANS_01 | Soybeans | DDP | 0.00 BU |

FIG. 20

CLOUD COMPUTING ENVIRONMENT

END-TO-END EXTENSIBILITY FRAMEWORK

CONTRACT

Contract Number: 12345

Pricing | Tolerance | Optionality | Fee | Delivered | PPA | Overview | Text | Settlements Schedule Details Items (2)
Sequence | Directions | Percentage | Percentage to
1... | Overfill | 1 | 9
1... | Underfill | 9 | 19

2110

Optionality
Items
Category | Value Type | Value | Unit of Measure Time UoM

*No Items Available*

Fee
Items
Level Description | Fee Description | Fee Type Description | External Note | Premium Discount Type

*No Items Available*

2130 — Overview
2120

FIG. 21

MULTI-LAYER EXTENSIBILITY FOR ENTERPRISE PORTAL

BACKGROUND

An enterprise may use applications to perform business functions. For example, a cloud-based enterprise portal may facilitate transactions, manage contracts between parties, track payments and the delivery of goods and services, etc. In software, "extensibility" may refer to the ability of a software system to allow and accept significant capability extensions without substantially rewriting code or changing the basic architecture. In general, extensibility may be associated with technology, tools, and/or languages that help developers expand and add to the system's capabilities. For example, extensibility may facilitate changes across technology layers (e.g., a design system, a Business Technology Platform ("BTP") portal, cloud integration, etc.). Extensibility lets companies build and run solutions that will be able to address needs beyond the original, standard product letting them bring innovation trends to systems without substantial risk to ongoing operations. Although, extensibility a key customer requirement for industry cloud solutions, actually implementing updates can still be a difficult, time consuming, and error-process—especially in relatively complex systems such as enterprise portals.

It would be desirable to provide multi-layer extensibility for an enterprise portal in a secure, efficient, and appropriate manner.

SUMMARY

Methods and systems may facilitate extensibility for an enterprise portal in a cloud computing environment. A computer processor of a multi-level extensibility framework server may provide to a user a graphical view of existing services of the enterprise portal using information from the business enterprise portal data store and a sample data model. The processor may also receive from the user extension information for at least one of the technical layers and, based on the received extension information, automatically generate and provide an intelligent extension proposal to the user. The processor may also display simulated results to the user based on the intelligent extension proposal and the sample data model. The processor may then receive from the user a confirmation of the intelligent extension proposal and automatically transfer extension fields, entities, and mapping to multiple technical layers of the enterprise portal.

Some embodiments comprise: means for providing, by a computer processor of a multi-level extensibility framework server to a user, a graphical view of existing services of an enterprise portal using information from a business enterprise portal data store, containing information about the enterprise portal for multiple technical layers of a cloud computing environment, and a sample data model; means for receiving from the user extension information for at least one of the technical layers; based on the received extension information, means for automatically generating and providing an intelligent extension proposal to the user; means for displaying simulated results to the user based on the intelligent extension proposal and the sample data model; and means for receiving from the user a confirmation of the intelligent extension proposal and automatically transferring extension fields, entities, and mapping to multiple technical layers of the enterprise portal.

Some technical advantages of some embodiments disclosed herein are improved systems and methods to provide multi-level extensibility for an enterprise portal in a secure, efficient, and appropriate manner.

BRIEF DESCRIPTION OF THE DRAWINGS

FIG. 14 is an example of a CDS entity according to some embodiments.

FIG. 15 illustrates a CDS projection in accordance with some embodiments.

FIG. 16 illustrates cloud integration mapping according to some embodiments.

FIG. 17 is an example of a CDS entity in accordance with some embodiments.

FIG. 19 is an example of UI5 metadata in accordance with some embodiments.

FIG. 20 is a manage contracts display according to some embodiments.

FIG. 21 is a contract display in accordance with some embodiments.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will now be described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
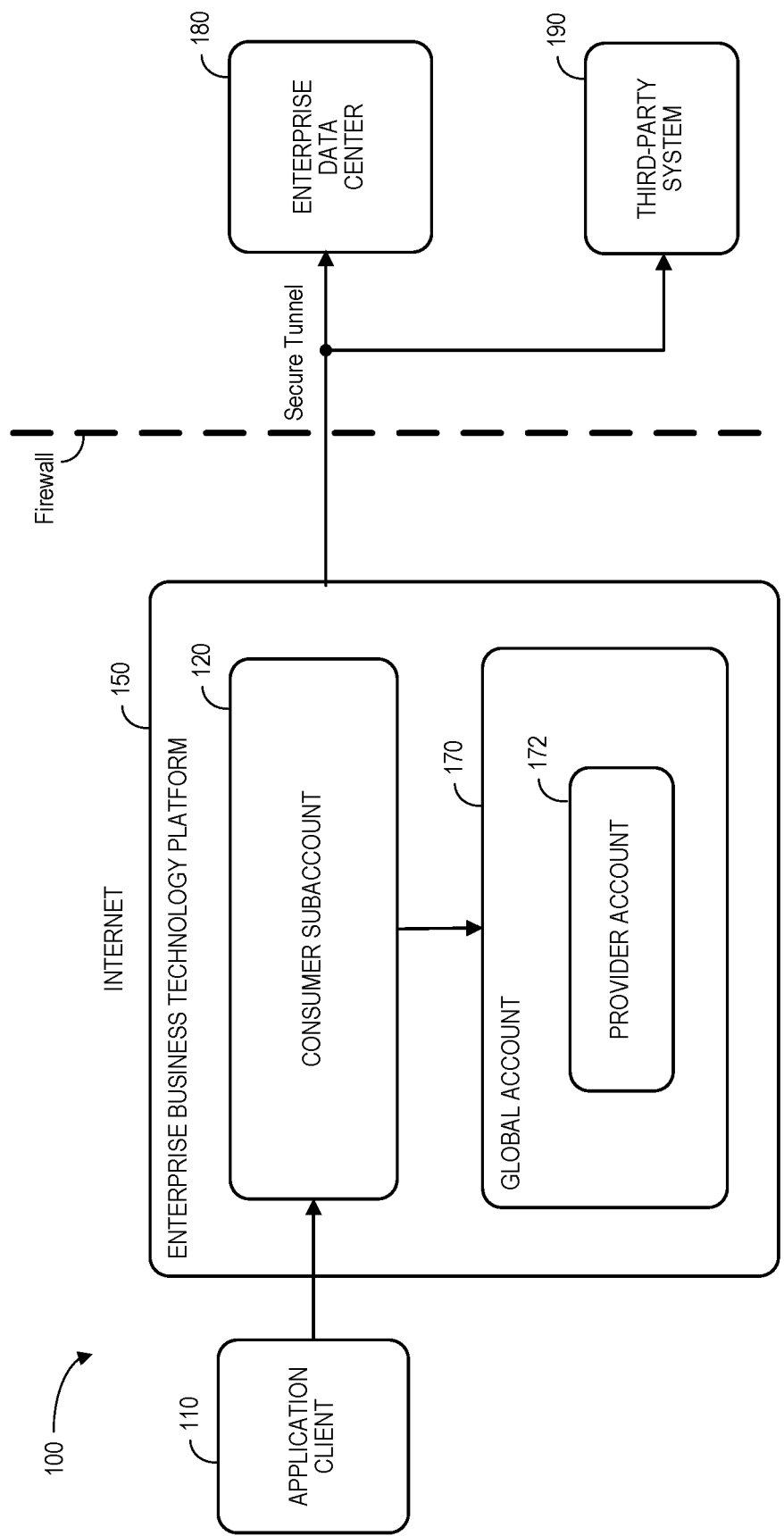
FIG. 1 is a high-level architecture for a system in accordance with some embodiments.

FIG. 1 is a high-level block diagram of a system 100 according to some embodiments. The system may let an administrator interact with an enterprise BTP via an application client 110 and the internet to create new applications, such as enterprise portals, or extend existing applications in a secure cloud computing environment. The enterprise BTP 150 may support a consumer or customer subaccount 120 as well as a global account 170 (e.g., associated with a provider account 172). The BTP 150 may communicate with an enterprise data center 180 and/or a third-party system 190 via a firewall and/or secure tunnel. According to some embodiments, the ability to extend an application may be at least partially automated. As used herein, the term "automatically" may refer to a device or process that can operate with little or no human interaction.

According to some embodiments, devices, including those associated with the system 100 and any other device described herein, may exchange data via any communication network, which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store data into and/or retrieve data from various data stores (e.g., databases at the enterprise data center 180 or third-party system 190), which may be locally stored or reside remote from the enterprise BTP 150. Although a single enterprise BTP 150 is shown in FIG. 1, any number of such devices may be included. Moreover, various devices described herein might be combined according to embodiments of the present invention. For example, in some embodiments, the enterprise BTP 150 and enterprise data center 180 might comprise a single apparatus. Some or all of the system 100 functions may be performed by a constellation of networked apparatuses, such as in a distributed processing or cloud-based architecture.

An operator (e.g., a database administrator) may access the system 100 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various accounts or mapping relationships) and/or provide or receive automatically generated recommendations, results, and/or alerts from the system 100.

According to some of the embodiments described herein, the system 100 utilizes various technology frameworks to achieve end-to-end extensibility, such as extensibility in Fiori®/UI® elements, extensibility in a Cloud Application Programming ("CAP") model for cloud-native applications, extensibility in a cloud integration suite, extensibility in a Representational State Transfer ("REST") Advanced Business Application Programming ("ABAP") Programming ("RAP") model for on-premises applications, etc.. Moreover, to provide a substantially seamless experience to customers, a framework is proposed to ease the process of extensibility.

Figure 2:
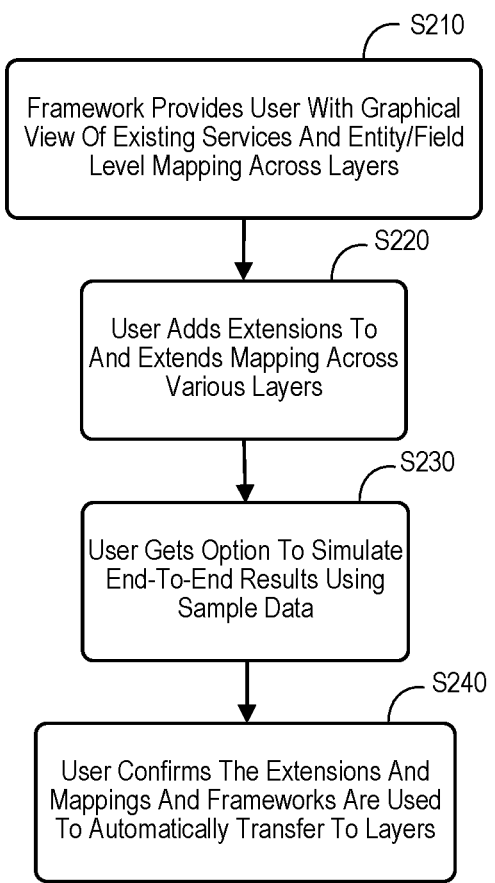
FIG. 2 illustrates a method according to some embodiments.

FIG. 2 illustrates a method to provide multi-level extensibility for an enterprise portal in a secure, efficient, and appropriate manner according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store instructions that when executed by a machine result in performance according to any of the embodiments described herein.

At S210, a framework may provide a user with a graphical view of existing services (and entity and field-level mapping) across multiple layers and the User Interface ("UI") with an example data model (e.g., based on an applicable business scenario). At S220, the user can add extensions to various layers and extend the mapping between the different layers. According to some embodiments, an intelligent proposal are provided to the user based on the field names. At S230, the user may receive an option to simulate end-to-end results using sample data. When the user confirms the extensions and corresponding mapping, the respective frameworks may automatically transfer the extension fields, entities, and mapping to respective technology layers at S240. Such an approach may help make the entire process substantially seamless—letting the user perform all of the extensions in a single place and thus reduce the overall complexity involved in the extension process.

Figure 3:
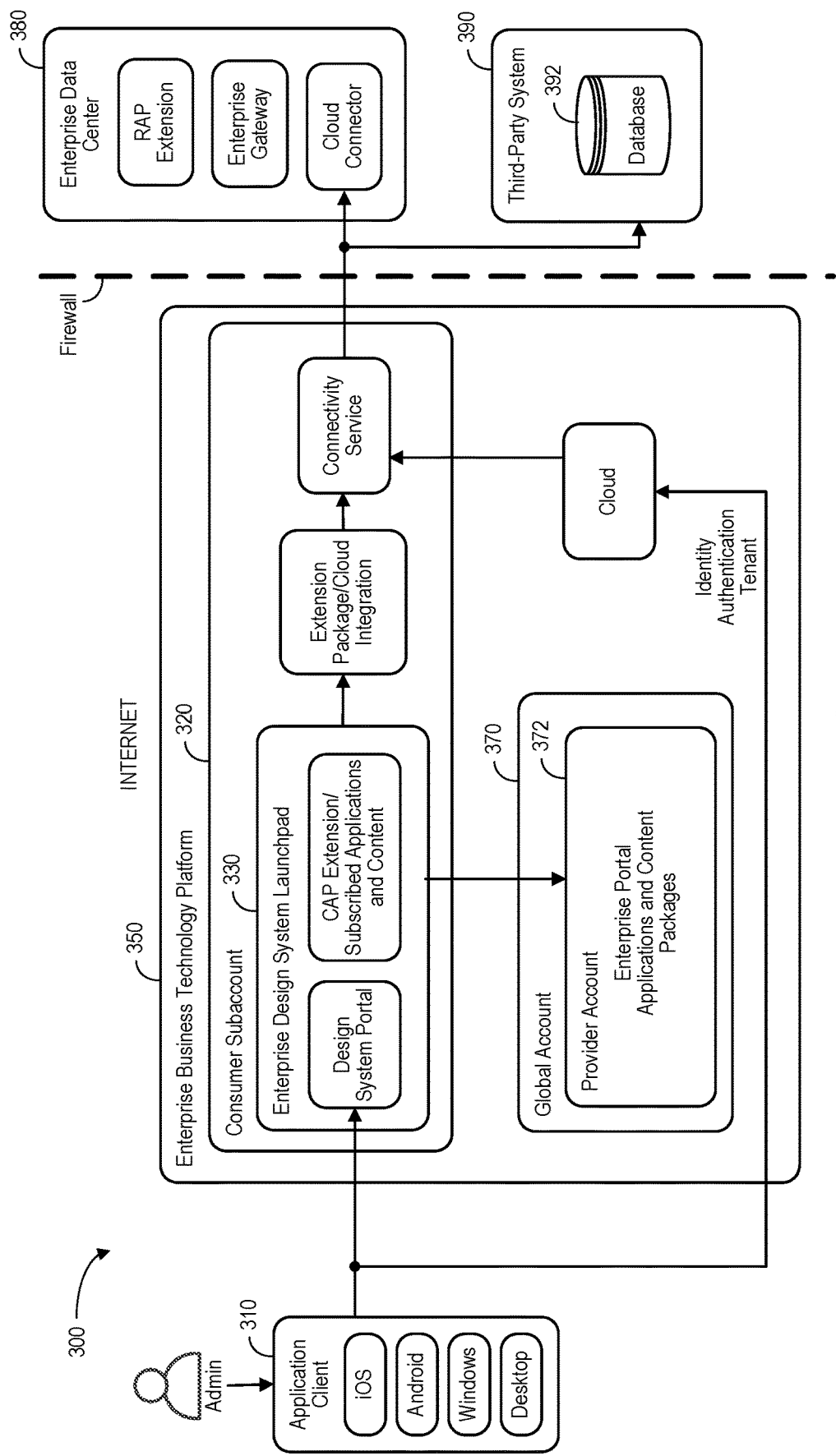
FIG. 3 is a more detailed architecture for a system in accordance with some embodiments.

FIG. 3 is a more detailed architecture for a system 300 in accordance with some embodiments. An administrator interacts with an application client 310 which might be associated with, for example, APPLE® iOS®, GOOGLE® ANDROID®, MICROSOFT® WINDOWS®, a computer desktop, etc. The application client 310 may be used, for example, to interact with a design system portal that can be used to create an enterprise portal. According to some embodiments, an enterprise BTP 350 may support a consumer subaccount 320 executing an enterprise design system launchpad 330 executing the design system portal and CAP extension/subscribed applications and content. The enterprise design system launchpad 330 may transmit information to a connectivity service via an extension package/cloud integration component.

A global account 370 may also be associated with an enterprise BTP 350. The global account 370 may be associated with a provider account 372 that supports enterprise portal applications and content packages. The application client 310 communicated with the connectivity service via an identity authentication tenant and the cloud. In this way, the connectivity service may interact with an enterprise data center 380 (e.g., via a cloud connector, an enterprise gateway, RAP extensions, etc.). The connectivity service may also exchange information with a third-party system 390, such as one associated with a database 392.

Figure 4:
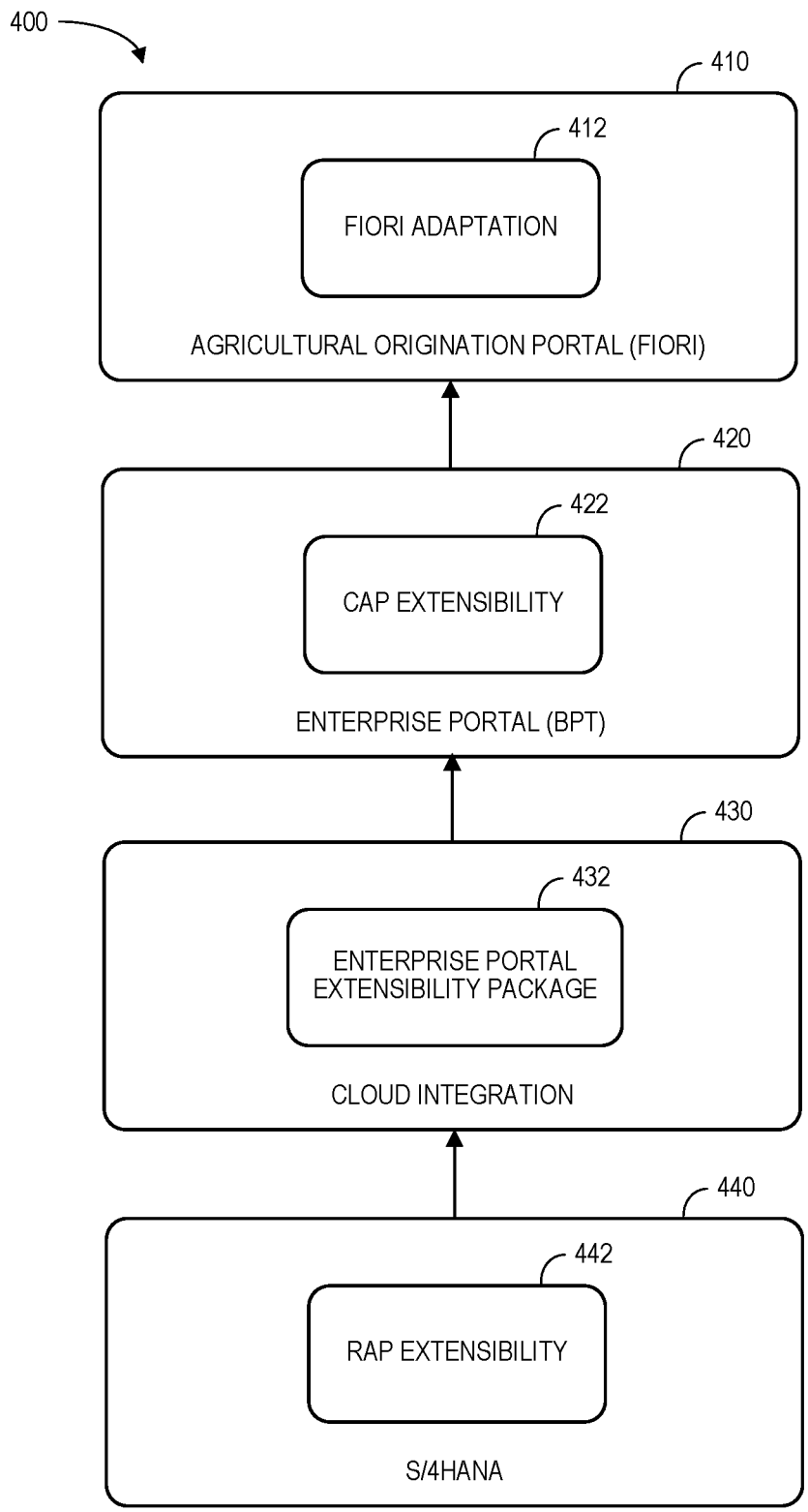
FIG. 4 illustrates end-to-end extensibility for an enterprise portal according to some embodiments.

FIG. 4 illustrates 400 "end-to-end" extensibility for an enterprise portal according to some embodiments. In particular, extensibility is provided for an enterprise design system portal 410. For example, Fiori® adaptations 412 and/or UI5® elements provided by SAP® may be supported. In addition, extensibility is provided for an enterprise portal BTP 420 (e.g., an origination portal for an agricultural transaction system). For example, CAP extensibility for cloud-native applications 422 provided by SAP® may be supported. Extensibility is also provided for cloud integration 430. Doer example, an extensibility package may be supported for an SAP® cloud integration suite 432. Finally, extensibility may be provided for Enterprise Resource Planning ("ERP") software 440 for large enterprises, such as S/4HANA® provided by SAP®. In this way, "end-to-end" extensibility may be provided from the enterprise design system portal 410 through the ERP software 440.

Figure 5:
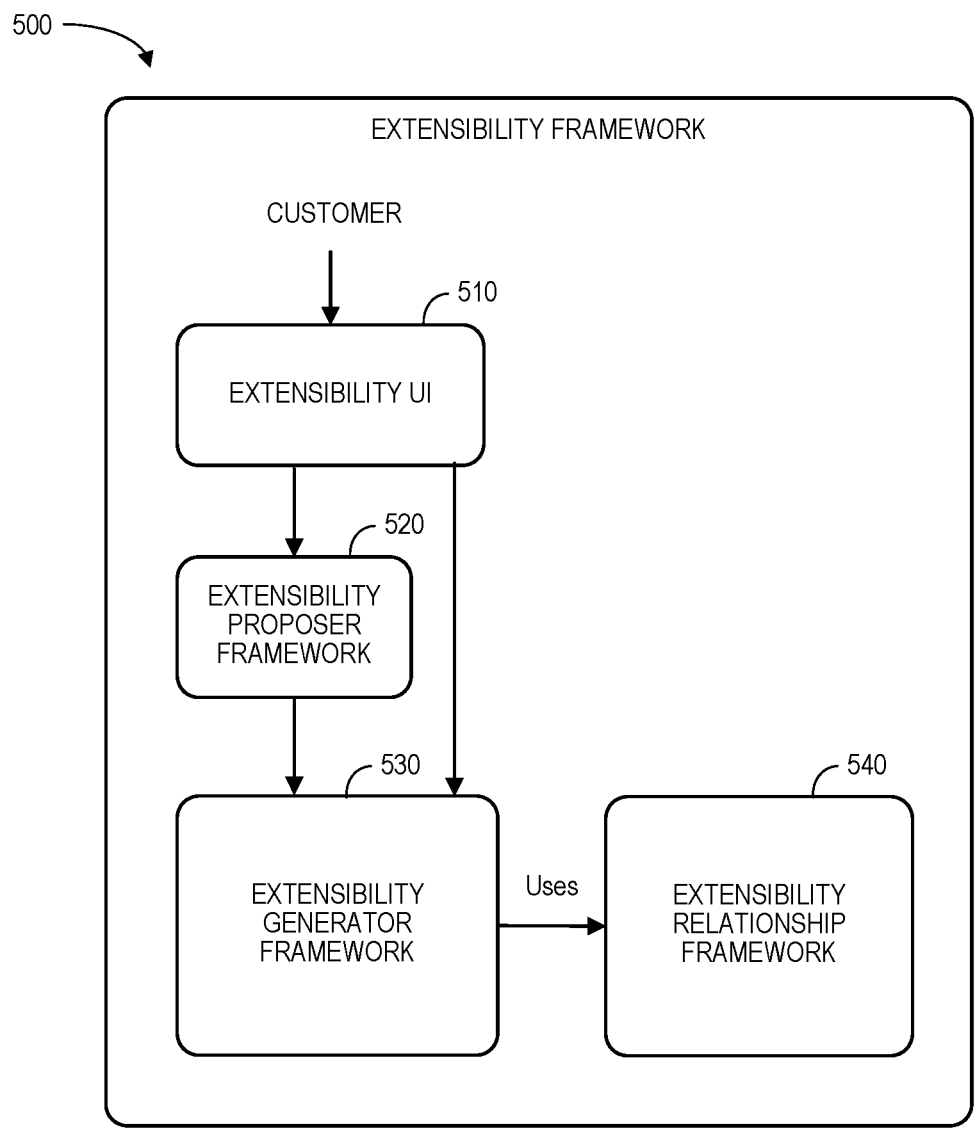
FIG. 5 is an extensibility framework in accordance with some embodiments.

FIG. 5 is an extensibility framework 500 in accordance with some embodiments. The extensibility framework 500 lets a customer exchange information with an extensibility proposer framework 520 via an extensibility User Interface ("UP") 510. The extensibility proposer framework 520 may read static database appends (field extensions) and associated tables in S/4HANA via an exposed API. The extensibility proposer framework 520 may then parse the data into a compatible format and pass it to an extensibility generator framework 530 to generate extensions (e.g., in a simulation mode).

The extensibility generator framework 530 receives information from the extensibility UI 510 and the extensibility proposer framework 520. The extensibility generator framework 530 may leverage an extensibility relationship framework 540 to obtain an existing pattern for intra and inter layer data mapping. Then, based on the user-selection, the extensibility generator framework 530 may generate an extension at each layer. The generation of the extension can also happen in a simulation mode which can be used by the extensibility proposer framework 520 to propose extension options to the end-user (by simulating extension at each technical layer).

According to some embodiments, the extensibility generator framework 530 may query the extensibility relationship framework 540 to propose extensions at each layer. Based on the data mapping, extensions may be generated in simulation mode for the end-user to visualize. Moreover, in some embodiments UI labels are proposed based on string patterns that are extracted from field metadata information from S/4HANA®.

Figure 6:
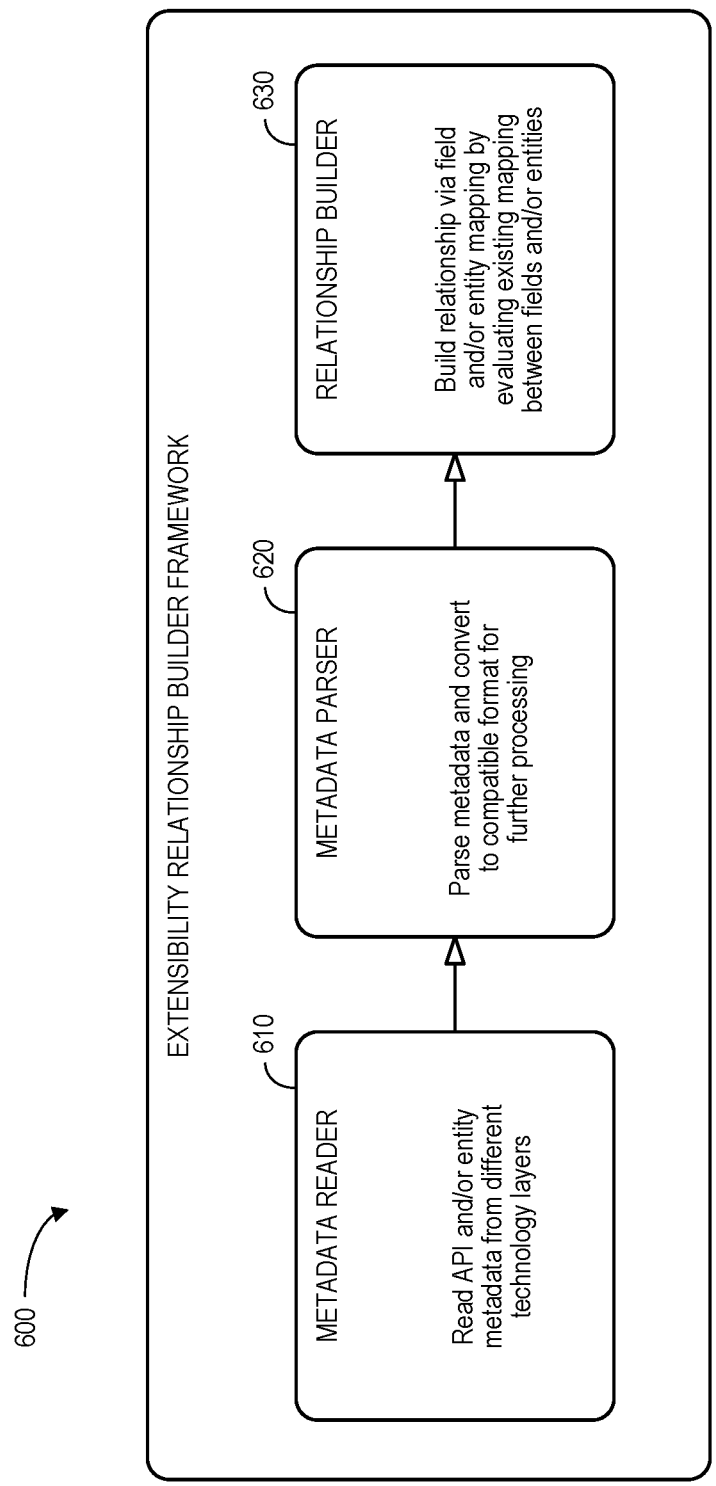
FIG. 6 is an extensibility relationship builder framework according to some embodiments.

FIG. 6 is an extensibility relationship builder framework 600 according to some embodiments. The extensibility relationship builder framework 600 extracts metadata information from each of the technical layers regarding the existing artifacts and mappings. The extensibility relationship builder framework 600 then pre-processes the information into a common format for further processing. The extensibility relationship builder framework 600 may then build the intra and inter relationship between different layers and persist that for further usage during extension generation.

Figure 7:
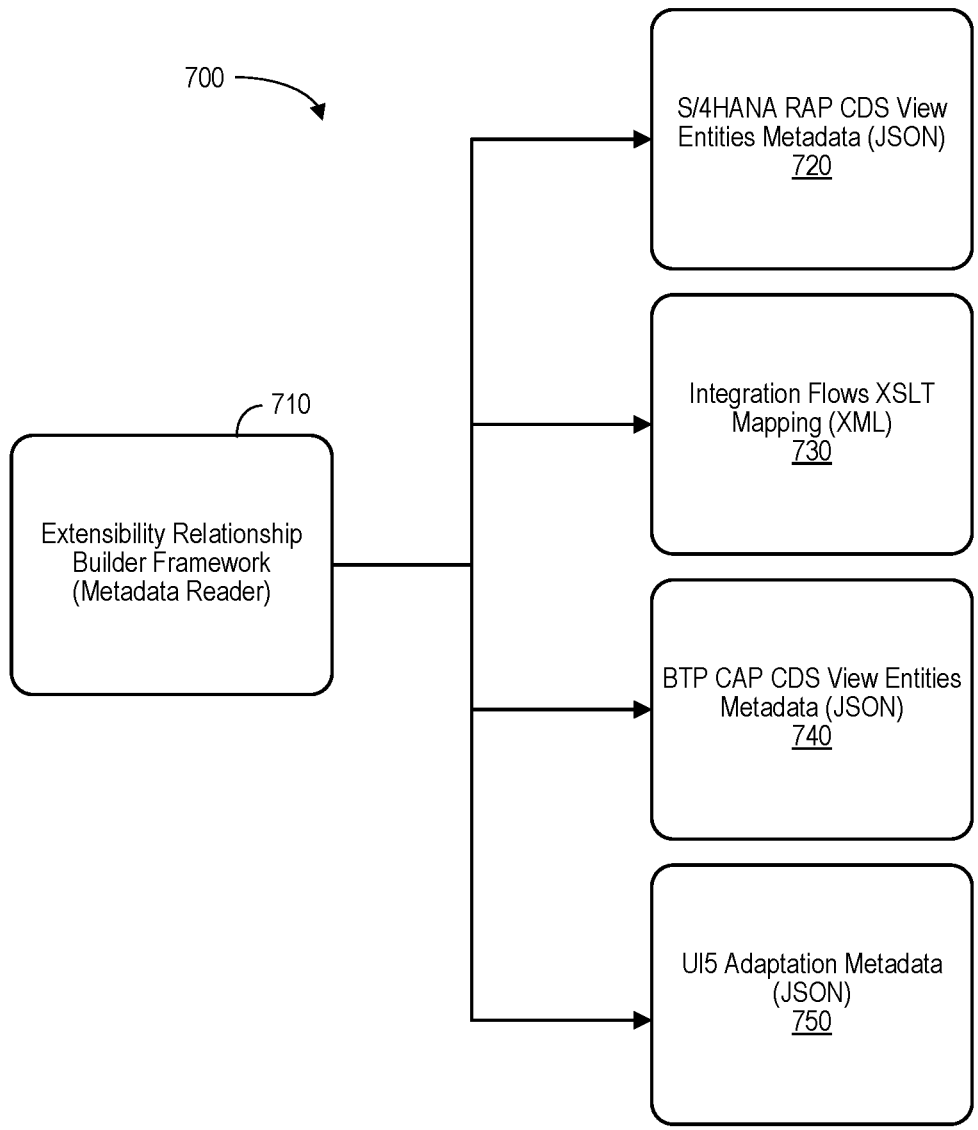
FIG. 7 is a metadata reader in accordance with some embodiments.

The extensibility relationship builder framework 600 may include a metadata reader 610 to read the API and/or entity metadata from different technology layers. For example, FIG. 7 is a metadata reader 700 in accordance with some embodiments. The metadata reader 700 may include an extensibility relationship builder framework 710 that supports S/4HANA® RAP Core Data Services ("CDS") view entities metadata (in JavaScript Object Notation ("JSON") format) 720. The extensibility relationship builder framework 410 may also support integration flow eXtensible Stylesheet Language Transformation ("XSLT") mapping (XML) 730, BTP CAP CDS view entities metadata (JSON) 740, and UI5® adaptation metadata (in JSON format) 750.

Figure 8:
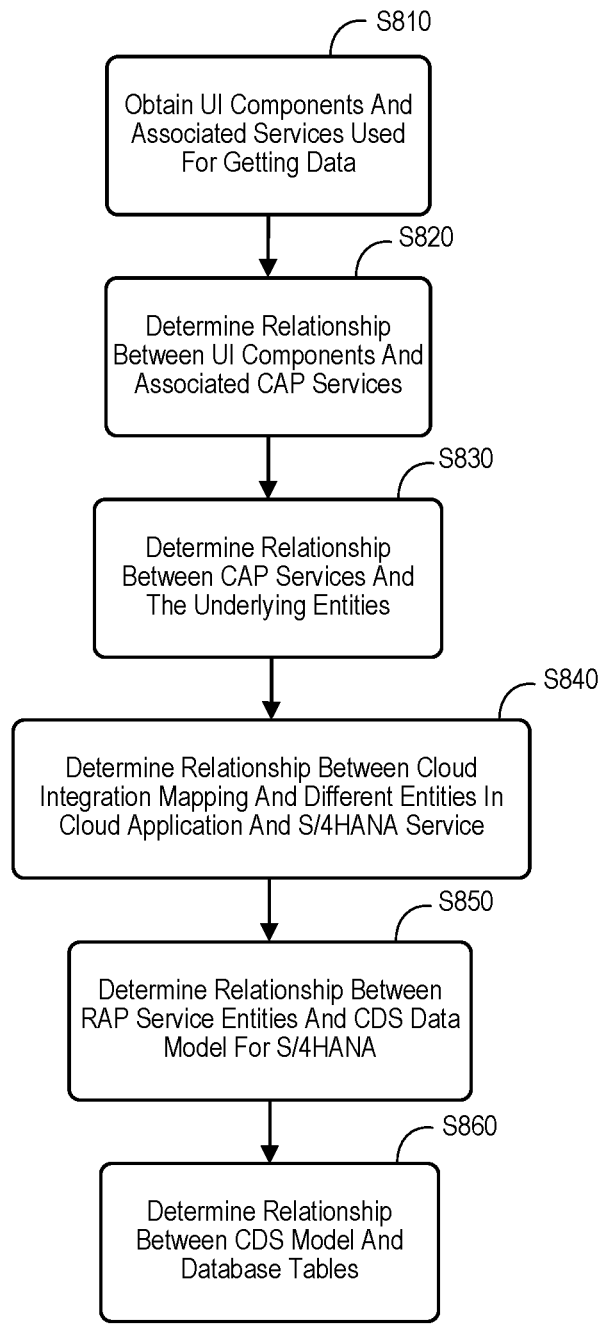
FIG. 8 is a relationship builder method according to some embodiments.

Referring again to FIG. 6, the extensibility relationship builder framework 600 may also include a metadata parser 620 to parse metadata and convert it to a compatible format for further processing. Finally, the extensibility relationship builder framework 600 may include a relationship builder 630 to build the relationship via field and/or entity mapping by evaluating existing mappings between fields and/or entities. For example, FIG. 8 is a relationship builder method according to some embodiments. At S810, the relationship builder may obtain all of the UI components and associated services used for getting data. At S820, the relationship builder may determine a relationship between the UI components and the associated CAP services. At S830, the relationship builder may determine a relationship between the CAP service and the underlying entities. At S840, the relationship builder may determine a relationship between cloud integration mapping and different entities in the cloud application and the S/4HANA® service. At S850, the relationship builder may determine a relationship between RAP service entities and CDS Data model for the S/4HANA®. At S860, the relationship builder may determine a relationship between a CDS model and database tables.

With respect to a technical implementation at the S/4HANA layer, the services that are used for integration to an enterprise portal are created using the ABAP RAP model. APIs may read RAP data model metadata to create and leverage entity metadata programmatically by the extensibility application. The API may read database field extension (appends) and associated database tables metadata. Some embodiments may create and leverage S/4HANA APIs that allow the read of field level database extensions in S/4HANA (appends) and customer/Z tables associated with the existing data using foreign keys. This may, for example, be utilized by the extensibility proposer framework.

Figure 9:
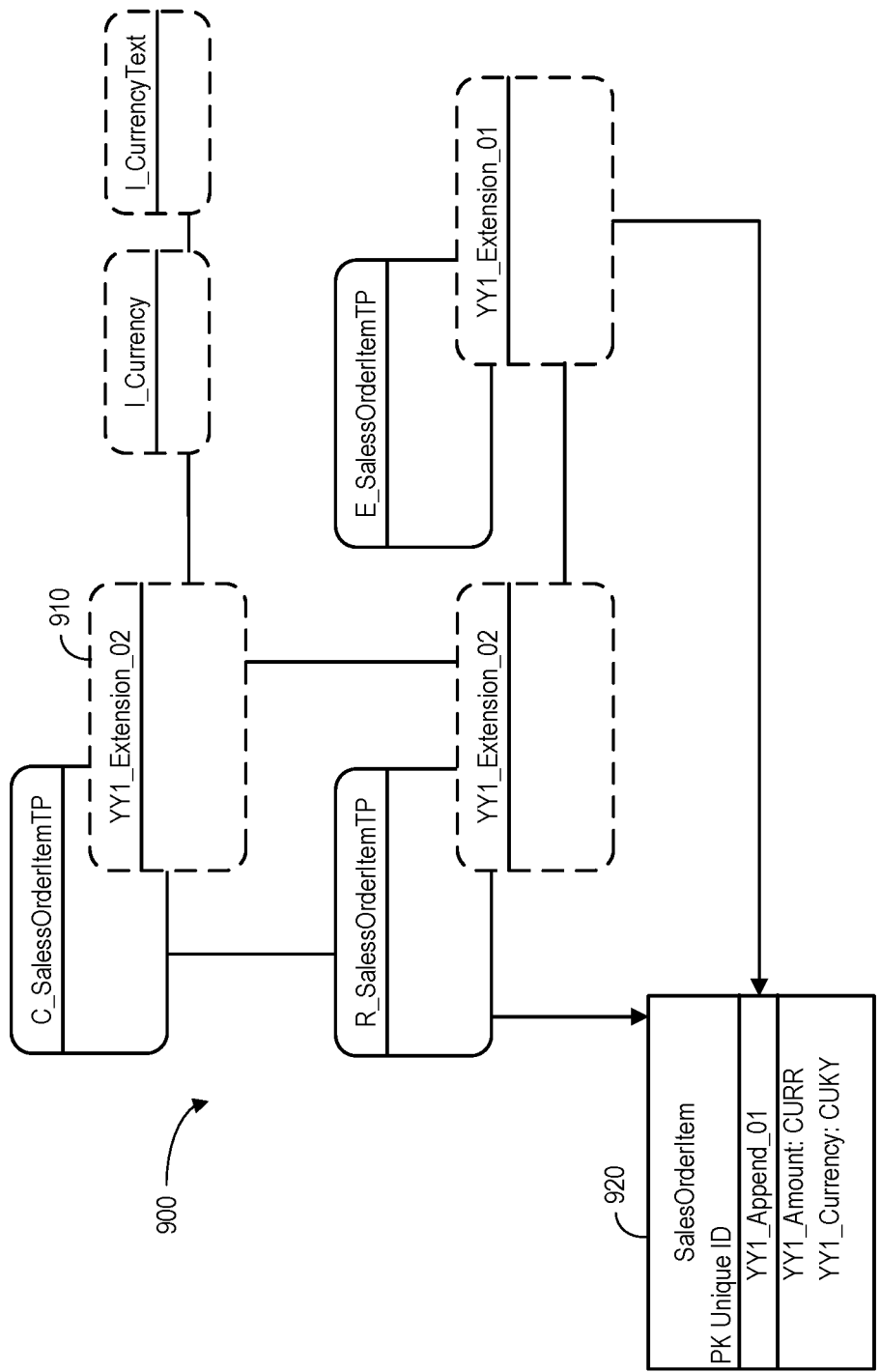
FIG. 9 is an example of RAP field-level extensions in accordance with some embodiments.

FIG. 9 is an example 900 of RAP field-level extensions in accordance with some embodiments. The extensions 910 (e.g., illustrated by dashed lines in FIG. 9) may be associated with, for example, a sales order item menu 920. Note that the system may use the API to create RAP extensions in S/4HANA. Embodiments may then utilize the extensibility options provided by the RAP framework to enable extensibility in the S/4HANA APIs. This approach may leverage exposed APIs to create RAP extensions programmatically by the extensibility application.

Figure 10:
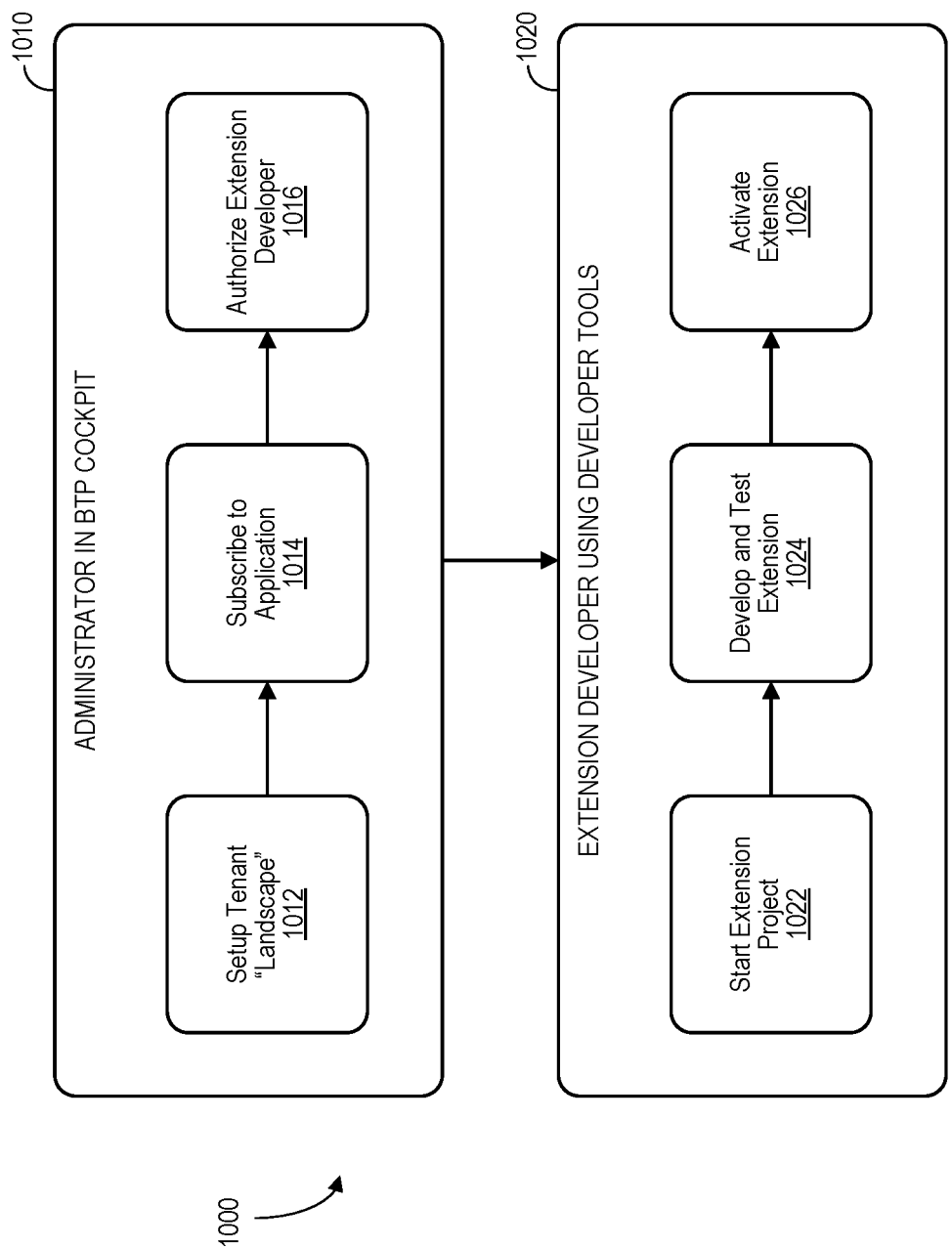
FIG. 10 is a CAP extension procedure in BTP according to some embodiments.

According to some embodiments, an extensibility feature may be available in a CAP framework to achieve field level and entity level extensions. For example, FIG. 10 is a CAP extension procedure 1000 in a BTP according to some embodiments. The procedure 1000 includes an administrator in BTP cockpit 1010 to setup a tenant landscape 1012, subscribe to an application 1014, and authorize an extension developer 1016. An extension developer using developer tools 1020 may then start an extension project 1022, develop and test that extension 1024, and eventually activate the extension 1026. Embodiments may create and leverage APIs to read CAP entity metadata programmatically by an extensibility application. Moreover, embodiments may leverage exposed APIs to create CAP extension projects programmatically (which will be triggered by the extensibility framework application).

Figure 11:
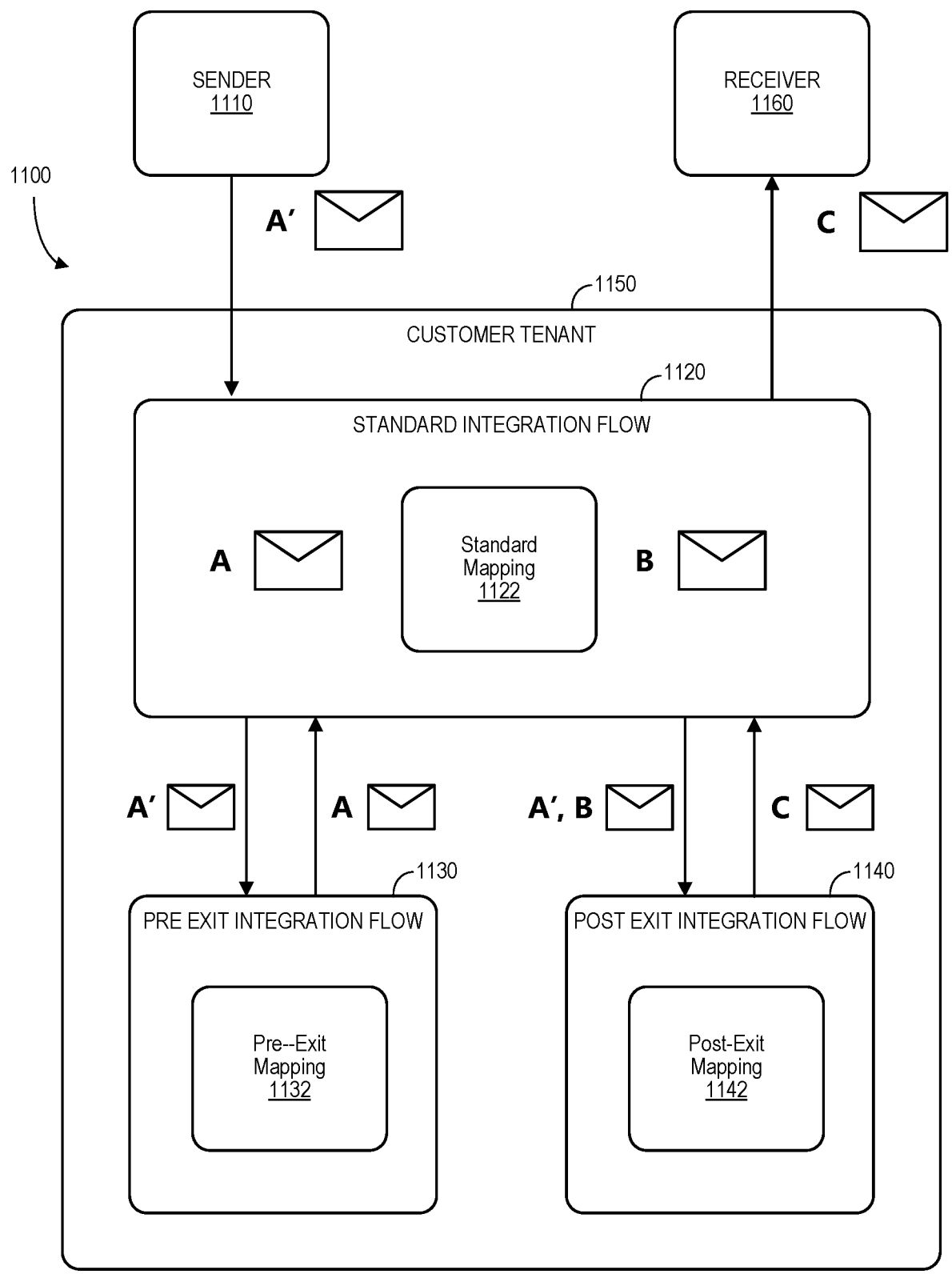
FIG. 11 is an integration extension flow in accordance with some embodiments.

FIG. 11 is an integration extension flow 1100 in accordance with some embodiments. A sender 1110 may send a message A' to a standard integration flow 1120 of a customer tenant 1150. The standard integration flow 1120 execute standard mapping 1122 and may be developed by a cloud service provider or a partner (e.g., a content publisher). The standard integration flow 1120 sends the A' message to a pre-exit integration flow 1130 executing in the customer tenant 1150. The pre-exit integration flow 1130 may execute pre-exit mapping 1132 (e.g., developed by a customer) such that it returns message A to the standard integration flow 1120. The standard integration flow 1120 may also send messages A' and B to a post-exit integration flow 1140 executing in the customer tenant 1150 (e.g., also developed by the customer). The post-exit integration flow 1140 may execute post-exit mapping 1142 and return message C to the standard integration flow 1120. The standard integration flow may then send message C to a receiver 1160. In this way, embodiments may leverage existing APIs to read integration flow mapping metadata programmatically by the extensibility framework application. Embodiments may also leverage exposed APIs to create integration flow extensions programmatically by the extensibility framework application.

With respect to UI5® (e.g., for a BTP), embodiments may use an API to read UI5® metadata for Fiori® elements. This may help create and leverage APIs to read UI5® Fiori® element metadata by the extensibility framework UI and/or API. Embodiments may also leverage exposed APIs to create a UI5® adaption programmatically by the extensibility framework UI and/or API.

Figure 12:
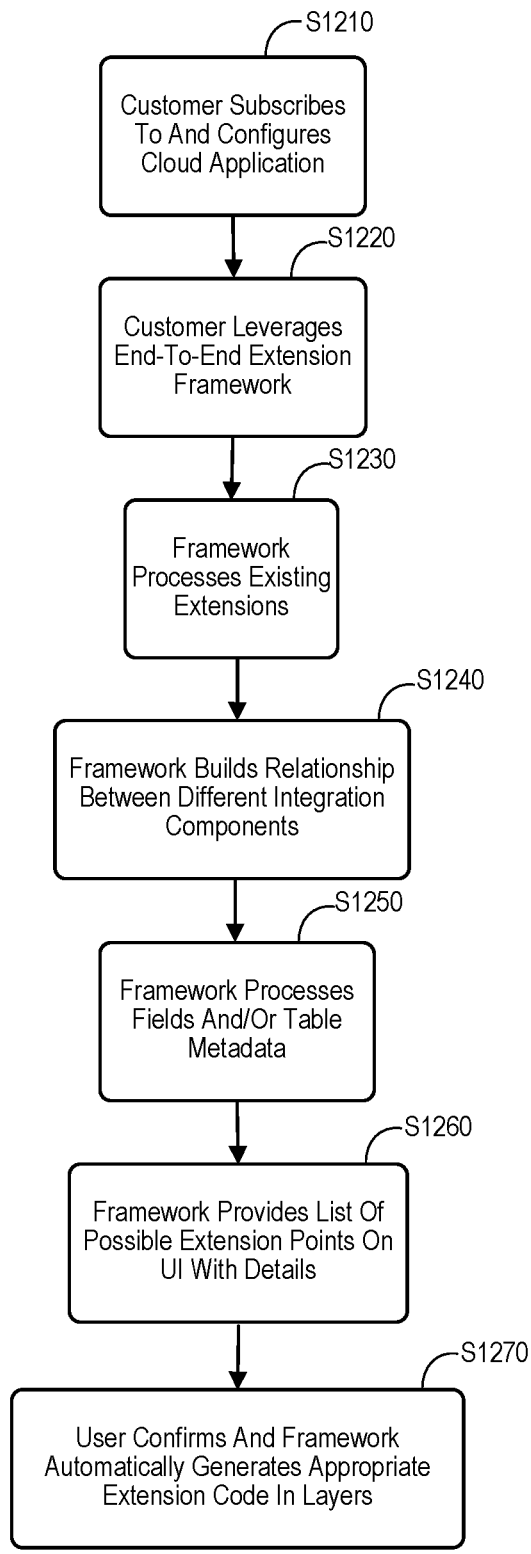
FIG. 12 is a high-level user method according to some embodiments.

Consider now a high-level user journey scenario where a customer already has a live S/4HANA® system and has performed extensions in an existing data model. Some of the examples described herein may be, but are not limited to, an agricultural transaction portal such as the SAP® agricultural origination portal that provides farmers with information on their business transactions (e.g., contracts with agricultural companies, delivery information, settlement data, unsold inventory, etc.). FIG. 12 is a high-level user method according to some embodiments.

At S1210, a customer may subscribe to an industry cloud application and perform the necessary configuration. At S1220, the customer may leverage a multi-level (e.g., "end-to-end") extension framework for the industry cloud in accordance with any of the embodiments described herein. At S1230, the framework processes the existing customer extensions in a S/4HANA® data model (using relationships to the existing data model being used in industry cloud). Note that there might be new database tables with foreign key relationships as compared to the existing tables (which are exposed in existing APIs) or there might be customer appends on the existing database tables.

At S1240, the framework builds a relationship between the different integration components, starting from database tables extension to S/4HANA CDS view RAP extension, then to API extension, then to cloud integration extension, then to cloud extension in CAP service, and finally to UI extension. At S1250, the framework processes the field/table metadata to get meaningful names for the UI. At S1260, the framework provides a list of possible extension points on the UI with the details processed in the earlier steps (and details may be adjusted, such as the position of elements, names of elements, etc.). When the user provides confirmation, the framework automatically generates the appropriate extension code required for each of the layers at S1270.

Figure 13:
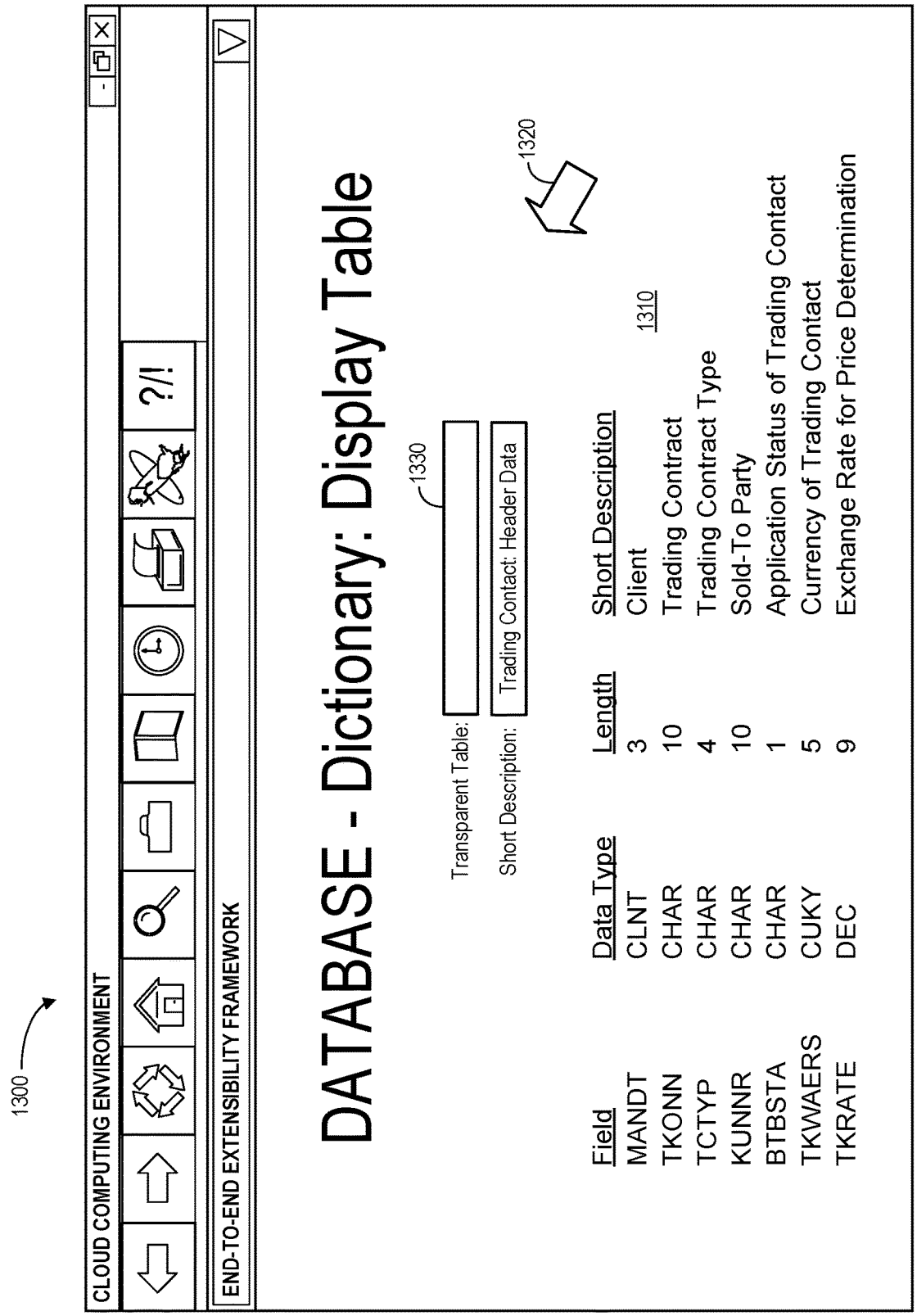
FIG. 13 is a database display in accordance with some embodiments.

Consider an example scenario where FIG. 13 is a database display 1300 in accordance with some embodiments. The database display 1300 might be associated with, for example, a cloud ERP database such as an S/4HANA® database provided by SAP® (an in-memory, column-oriented, relational database management system that stores and retrieves data as requested by applications). The display 1300 includes a table 1310 showing various data dictionary items such as a field name, data type, length, description, etc. According to some embodiments, selection of a data item (e.g., via a touchscreen or computer mouse pointer 1320) may result in further information being displayed about that data item (e.g., in a popup window). In some embodiments, the display 1300 may be arranged by attributes, delivery dates, currency, quantity, etc. Additional elements 1330 may be used to display and/or enter details about the data dictionary display 1300.

FIG. 14 is an example of a CDS entity 1400 according to some embodiments. Note that a data model may represent a framework of what relationships exist in a database. Data models may provide a standardized method for defining and formatting database contents consistently across systems, enabling different applications to share the same data. S/4HANA® supports a new data model by providing a ready-to-use content using Core Data Services ("CDS") views where data models are defined and consumed on the database rather than on an application server. CDS also offers capabilities beyond traditional data modeling tools, including support for conceptual modeling and relationship definitions, built-in functions, and extensions The CDS entity 1400 includes access control information 1410 and a list of data elements 1420.

FIG. 15 illustrates a CDS projection 1500 in accordance with some embodiments. Within the RAP model, CDS projection views define interfaces on the basis of existing CDS view models. A projection view is based on one existing CDS view entity and exposes a subset of elements required for a specific business service. As shown in FIG. 15, the CDS projection 1500 may include objection model parameters 1510 and a list of data elements 1520.

Figure 18:
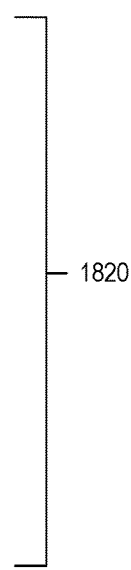
FIG. 18 illustrates CAP projection according to some embodiments.

FIG. 16 illustrates cloud integration mapping 1600 according to some embodiments. Note that SAP® cloud integration message mapping is a data transformation component in cloud integration scenarios. As shown in FIG. 16, the integration mapping 1600 may include a variable name definition 1610 and trading contract header parameter data 1620. FIG. 17 is an example of a CDS entity 1700 in accordance with some embodiments. Note that the SAP® Cloud Application Programming ("CAP") model is a framework of languages, libraries, and tools for building enterprise-grade services and applications. The CAP model may guide developers along a path of good practices and a substantial number of "out-of-the-box" solutions for recurring tasks. As shown in FIG. 17, the CAP entity 1700 may include data 1710 for each trading contract parameter (e.g., a data type, length, title, etc.). FIG. 18 illustrates CAP projection 1800 according to some embodiments. As shown in FIG. 18, the CAP projection 1800 uses an inner join BusinessPartnerUserView as businessPartnerUserView 1810 and includes a list of trading contract parameters 1820.

FIG. 19 is an example of UI5® metadata 1900 in accordance with some embodiments. Note that UI5® is a JavaScript framework and UI library that helps developers create cross-platform enterprise-ready web applications in an efficient way. It features UI controls aligned with the latest SAP® Fiori® design guidelines and has support for data binding, routing, message handling, etc. As shown in FIG. 19, the metadata 1900 may include text 1910 (e.g., a trading contract number), arrangement information, a value list, etc.

FIG. 20 is a manage contracts display 2000 according to some embodiments. The display 2000 includes a list of contracts 2010 that might include a contract and/or item number, delivery period, material, commodity, a paid quantity, an open quantity, etc. Selection of an element in the list of contracts 2010 (e.g., via a touchscreen or computer mouse pointer 2020) may result in further information being displayed about that element (e.g., in a popup window). The display 2000 also includes data entry areas 2030 that let a user search for, by way of example, a particular contract number, delivery period, material, commodity, payment date, unit of measure, signed status, contract state, status, etc.

FIG. 21 is a contract display 2100 in accordance with some embodiments. The display 2100 includes schedule details 2110 for items, such as a direction (overfill or underfill), percentage from, percentage to, optionality information, fee information, etc. Selection of an element in the schedule details 2110 (e.g., via a touchscreen or computer mouse pointer 2120) may result in further information being displayed about that element (e.g., in a popup window). The display 2100 also includes selections 2130 to let a user sort information by pricing, tolerance, optionality, fee, Pre-Payment Agreement ("PPA"), text, etc.

Consider, for example, an extension via any of the frameworks described herein in connection with a field level extension. In this example, the customer has a field extension in DB in S/4HANA in a "WBHK" table. For the customer account number, the extensibility proposer framework may automatically detect the extension available in S/4HANA based on metadata read from a S/4HANA technical API. It then uses the extension generation framework (which internally leverages extensibility relationship builder framework) to simulate extension at each technical layer described herein. Finally, the framework proposes a UI point where the extension can be placed along with a proposed field name (which is based on the field description in S/4HANA). The customer can adjust the proposal and then confirm (which will actually generate the extension at each layer as appropriate).

For an entity level extension, consider a customer who has a Z-table (custom table) "ZAccount_Details" created in a database in S/4HANA that is associated to the WBHK table using contract number as foreign key. This table has three fields:

ContractNumber type TKONN (Primary Key)—Foreign key relationship with TKONN of WBHK,
Account_number type integer (Description—"Customer Account Number"), and.
Account_type type character (Description—"Customer Account Type")

The extensibility proposer framework may capture the details of the customer table (since it is associated to the standard table WBHK). It can then use the extension generation framework (which internally leverages the extensibility relationship builder framework) to simulate entity level extension at each technical layer described herein. The framework then proposes a new tab in the existing UI where the extension entity fields can be placed along with a proposed tab name and field names (based on the field and table description in S/4HANA). The customer can adjust the proposal and then confirm (which actually generates the extension at each layer as appropriate).

Figure 22:
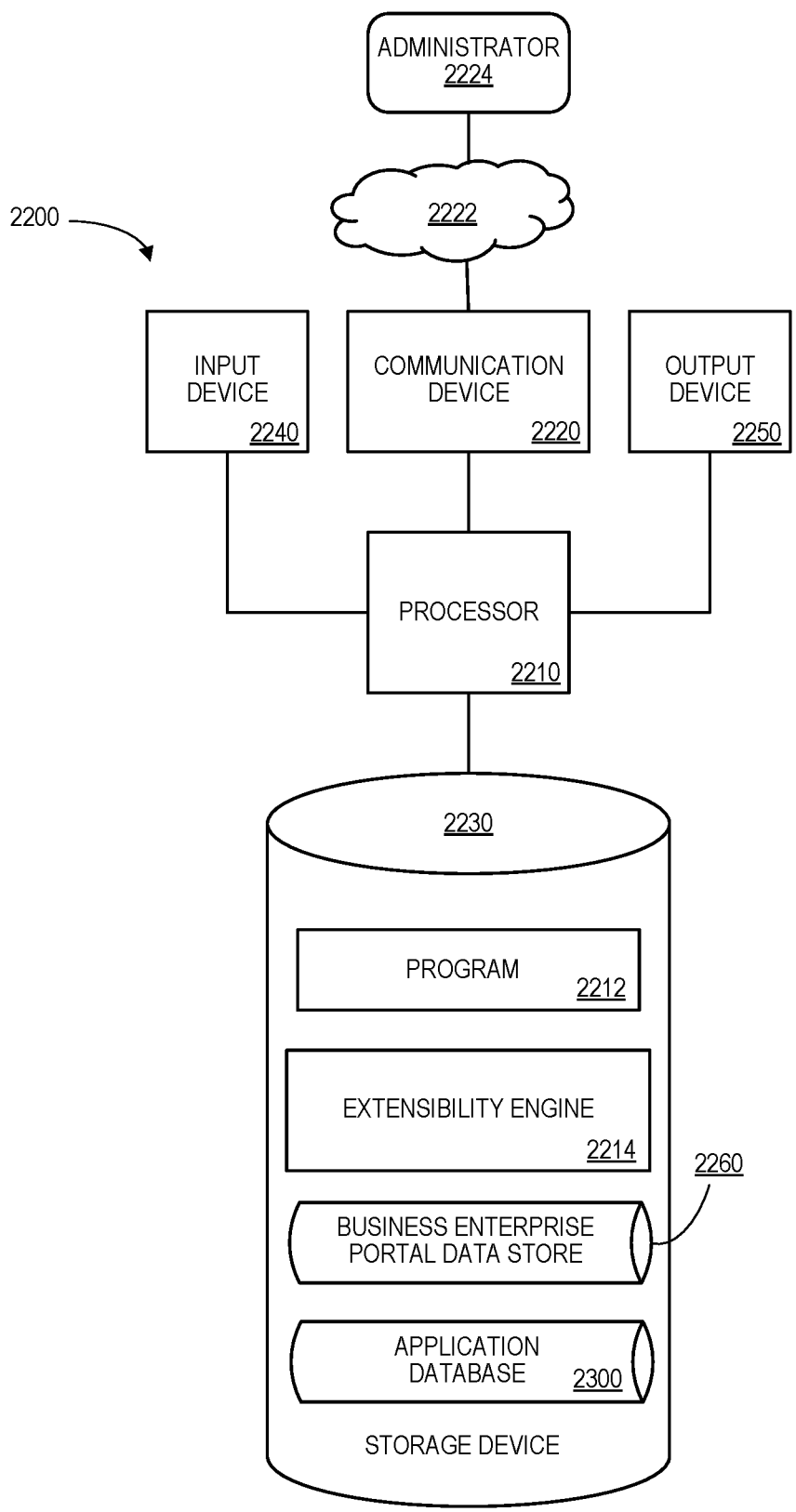
FIG. 22 is an apparatus or platform according to some embodiments.

Note that the embodiments described herein may be implemented using any number of different hardware configurations. For example, FIG. 22 is a block diagram of an apparatus or platform 2200 that may be, for example, associated with the system 100, 300 of FIG. 1 or 3 respectively (and/or any other system described herein). The platform 2200 comprises a processor 2210, such as one or more commercially available CPUs in the form of one-chip microprocessors, coupled to a communication device 2220 configured to communicate via a communication network (not shown in FIG. 22). The communication device 2220 may be used to communicate, for example, with one or more remote user platforms or an administrator device 2224 via a communication network 2222. The platform 2200 further includes an input device 2240 (e.g., a computer mouse and/or keyboard to input data about an enterprise portal or data sources) and an output device 2250 (e.g., a computer monitor to render a display, transmit recommendations or alerts, and/or create monitoring reports). According to some embodiments, a mobile device and/or PC may be used to exchange data with the platform 2200.

The processor 2210 also communicates with a storage device 2230. The storage device 2230 can be implemented as a single database, or the different components of the storage device 2230 can be distributed using multiple databases (that is, different deployment data storage options are possible). The storage device 2230 may comprise any appropriate data storage device, including combinations of magnetic storage devices (e.g., a hard disk drive), optical storage devices, mobile telephones, and/or semiconductor memory devices. The storage device 2230 stores a program 2212 and/or extensibility engine 2214 for controlling the processor 2210. The processor 2210 performs instructions of the programs 2212, 2214, and thereby operates in accordance with any of the embodiments described herein. For example, the processor 2210 may provide to a user a graphical view of existing services of the enterprise portal using information from a business enterprise portal data store 2260 and a sample data model. The processor 2210 may also receive from the user extension information for at least one of the technical layers and, based on the received extension information, automatically generate and provide an intelligent extension proposal to the user. The processor 2210 may also display simulated results to the user based on the intelligent extension proposal and the sample data model. The processor 2210 may then receive from the user a confirmation of the intelligent extension proposal and automatically transfer extension fields, entities, and mapping to multiple technical layers of the enterprise portal.

The programs 2212, 2214 may be stored in a compressed, uncompiled and/or encrypted format. The programs 2212, 2214 may furthermore include other program elements, such as an operating system, clipboard application, a database management system, and/or device drivers used by the processor 2210 to interface with peripheral devices.

As used herein, data may be "received" by or "transmitted" to, for example: (i) the platform 2200 from another device; or (ii) a software application or module within the platform 2200 from another software application, module, or any other source.

In some embodiments (such as the one shown in FIG. 22), the storage device 2230 further the business enterprise portal data store 2260 and an application database 2300. An example of a database that may be used in connection with the platform 2200 will now be described in detail with respect to FIG. 23. Note that the database described herein is only one example, and additional and/or different data may be stored therein. Moreover, various databases might be split or combined in accordance with any of the embodiments described herein.

Figure 23:
FIG. 23 illustrates a query database in accordance with some embodiments.

Referring to FIG. 23, a table is shown that represents the application database 2300 that may be stored at the platform 2200 according to some embodiments. The table may include, for example, entries identifying applications that have been automatically extended to multiple technical layers. The table may also define fields 2302, 2304, 2306, 2308 for each of the entries. The fields 2302, 2304, 2306, 2308 may, according to some embodiments, specify: an application identifier 2302, a sample data model 2304, an intelligent extension proposal 2306, and simulated results 2308. The application database 2300 may be created and updated, for example, when a new application is extended, when simulated results 2308 are generated, etc.

The application identifier 2302 might be a unique alphanumeric label or link that is associated with a business enterprise portal that is be being extended by a user or administrator. The sample data model 2304 may be associated with the application identifier 2302 and may be automatically generated based on metadata of a business enterprise portal. The intelligent extensibility proposal 2306 may be automatically generated by an extensibility framework may cover multiple technical layers (e.g., it may comprise an "end-to-end" proposal). The simulated results 2308 may be generated by running the sample data model 2304 through the intelligent extensibility proposal 2306. The simulated results 2308 may result in a user adjusting or confirming the intelligent extensibility proposal 2306.

Figure 24:
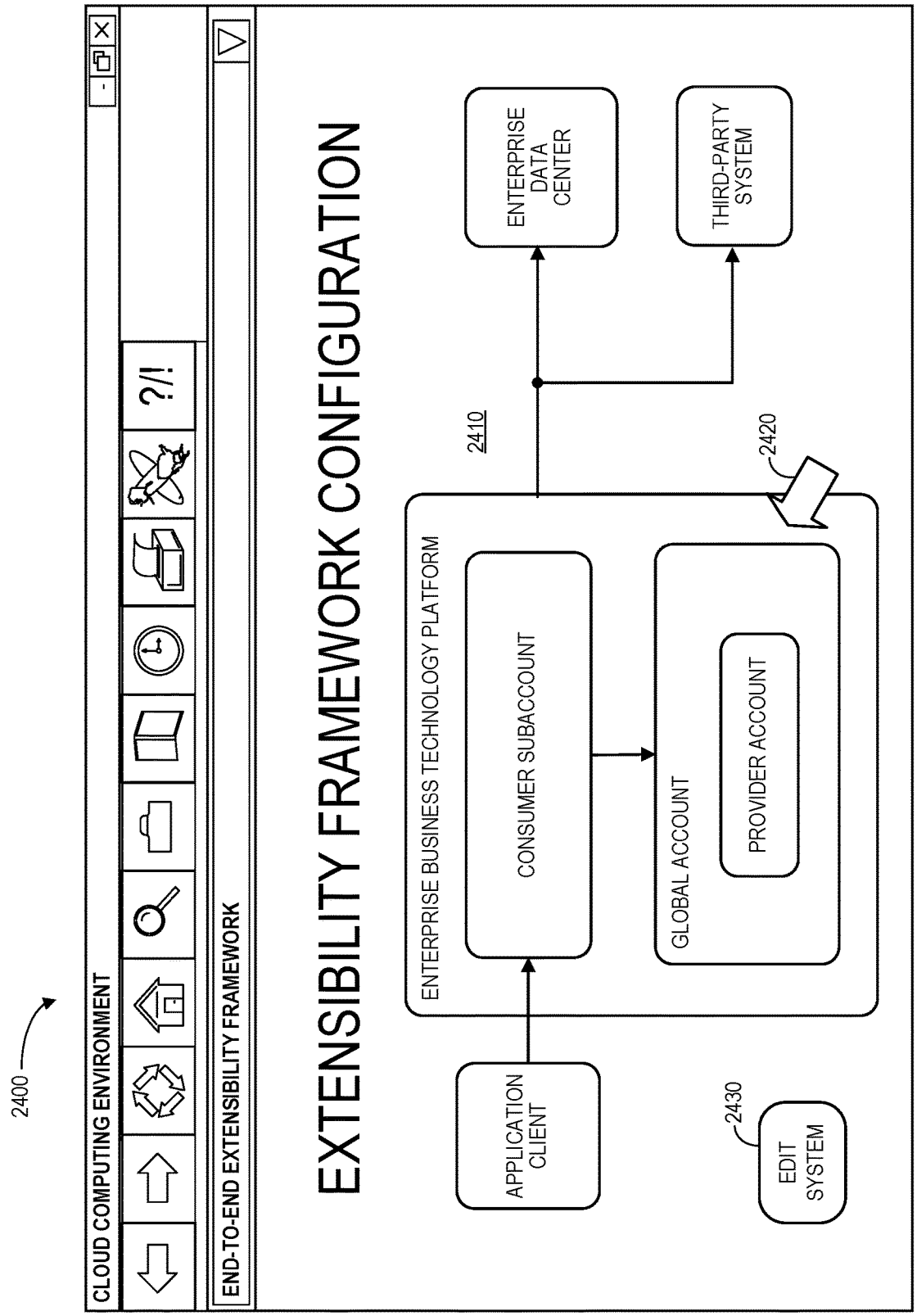
FIG. 24 is a human machine interface display in accordance with some embodiments.

FIG. 24 is a human-machine interface display 2400 in accordance with some embodiments. The display 2400 includes a graphical representation 2410 or dashboard that might be used to manage or monitor an extensibility framework for a business enterprise portal (e.g., associated with a cloud provider). In particular, selection of an element (e.g., via a touchscreen or computer mouse pointer 2420) might result in the display of a popup window that contains configuration data. The display 2400 may also include a user-selectable "Edit System" icon 2430 to request system changes (e.g., to investigate or improve system performance).

Thus, embodiments may help provide end-to-end extensibility for an enterprise portal in an efficient and appropriate manner. Although some embodiments have been described in connection with particular types of portals and technical layers, note that embodiments may be associated with other types of applications and layers as well. For example, some embodiments may cover multiple technical layers: UI5®, BTP, Cloud Integration, and S/4HANA®.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 25:
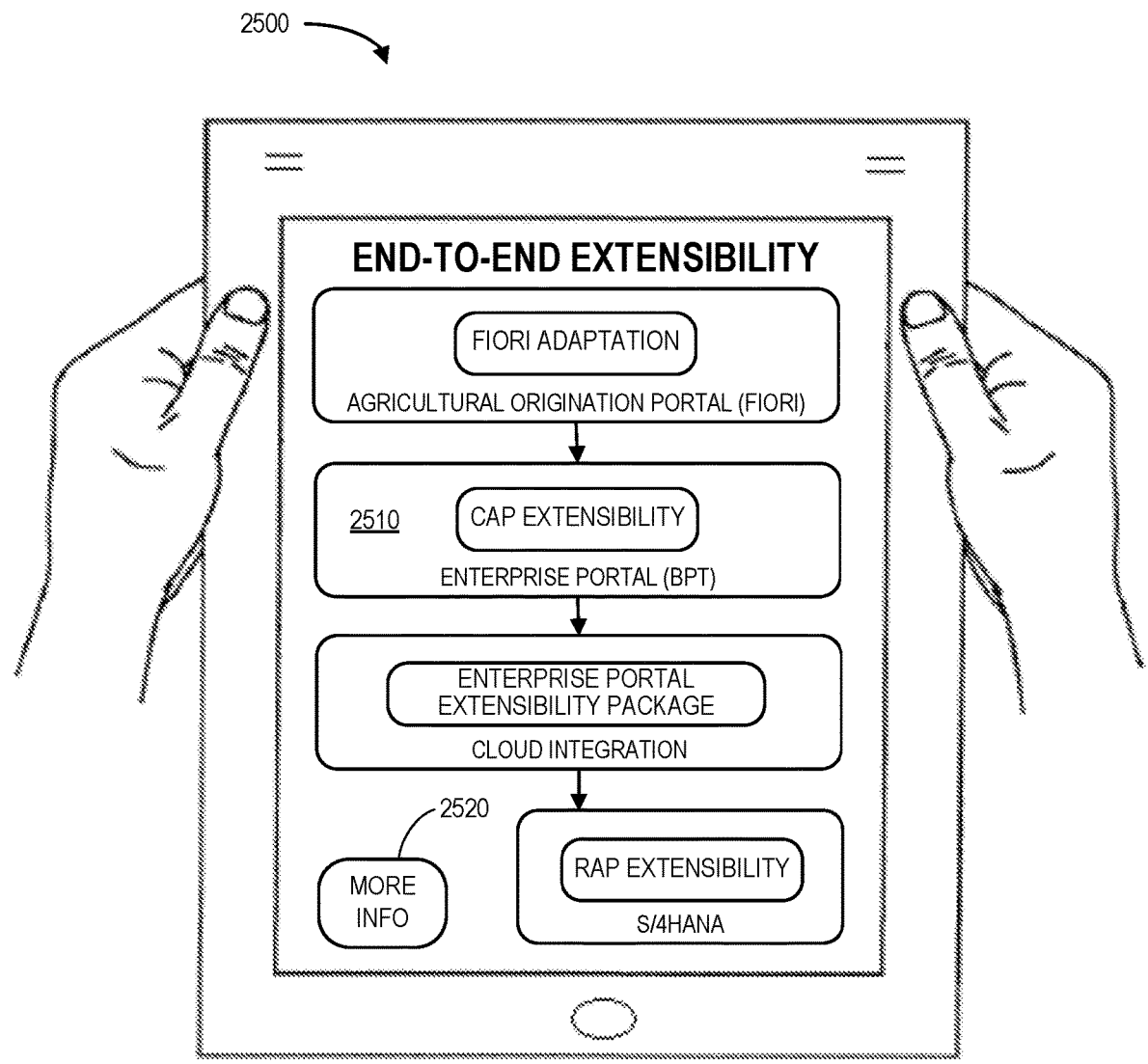
FIG. 25 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, the displays shown herein are provided only as examples, and any other type of user interface could be implemented. For example, FIG. 25 shows a handheld tablet computer 2500 rendering an end-to-end extensibility framework display 2510 that may be used to view or adjust existing system framework components and/or to request additional data (e.g., via a "More Info" icon 2520).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to facilitate extensibility for an enterprise portal, comprising:
a business enterprise portal data store containing information about the enterprise portal for multiple technical layers of a cloud computing environment including an enterprise portal design system layer, a cloud application programming model framework, a cloud integration layer, and an Enterprise Resource Planning ("ERP") solution layer; and
a multi-level extensibility framework server, coupled to the business enterprise portal data store, including:
an extensibility relationship framework to extract metadata from the multiple technical layers regarding existing artifacts and mappings, wherein the extensibility relationship framework includes a metadata reader, a metadata parser, and a relationship builder;
a computer processor, and
a memory storage device, coupled to the computer processor, including instructions that, when executed by the computer processor, enable the multi-level extensibility framework server to:
(i) provide to a user a graphical view of existing services of the enterprise portal using information from the business enterprise portal data store and a sample data model,
(ii) receive from the user extension information for at least one of the technical layers and, based on the received extension information, automatically generate and provide an intelligent extension proposal to the user based on information from the extensibility relationship framework,
(iii) display simulated results to the user based on the intelligent extension proposal and the sample data model, and
(iv) receive from the user a confirmation of the intelligent extension proposal and automatically transfer extension fields, entities, and mapping to the multiple technical layers of the enterprise portal.

2. The system of claim 1, wherein the multi-level extensibility framework server generates an "end-to-end" intelligent extension proposal from the enterprise portal design system layer to the ERP solution layer.

3. The system of claim 1, wherein the multi-level extensibility framework server receives from the user adjustments to the intelligent extension proposal.

4. The system of claim 1, wherein the multi-level extensibility framework server includes an extensibility proposer framework to read field extensions and associated tables via an exposed Application Programming Interface ("API").

5. The system of claim 1, wherein the multi-level extensibility framework server includes an extensibility generator framework to determine intra and inter layer data mapping.

6. The system of claim 1, wherein the extensibility relationship framework provides extensibility in a Representational State Transfer ("REST") Advanced Business Application Programming ("ABAP") Programming ("RAP") model for on-premises applications.

7. The system of claim 6, wherein the extensibility relationship framework provides extensibility in User Interface ("UP") elements.

8. The system of claim 7, wherein the extensibility relationship framework provides extensibility in a Cloud Application Programming ("CAP") model for cloud-native applications.

9. The system of claim 8, wherein the extensibility relationship framework provides extensibility in a cloud integration suite.

10. A computer-implemented method to facilitate extensibility for an enterprise portal, comprising:
providing, by a computer processor of a multi-level extensibility framework server, an extensibility relationship framework to extract metadata from the multiple technical layers, including an enterprise portal design system layer, a cloud application programming model layer framework, a cloud integration layer, and an Enterprise Resource Planning ("ERP") solution layer, the metadata being associated with existing artifacts and mappings, wherein the extensibility relationship framework includes a metadata reader, a metadata parser, and a relationship builder;
providing, by the computer processor of the multi-level extensibility framework server to a user, a graphical view of existing services of the enterprise portal using information from a business enterprise portal data store, containing information about the enterprise portal for the multiple technical layers of a cloud computing environment and a sample data model;
receiving from the user extension information for at least one of the technical layers;
based on the received extension information, automatically generating and providing an intelligent extension proposal to the user based on information from the extensibility relationship framework;
displaying simulated results to the user based on the intelligent extension proposal and the sample data model; and
receiving from the user a confirmation of the intelligent extension proposal and automatically transferring extension fields, entities, and mapping to the multiple technical layers of the enterprise portal.

11. The method of claim 10, wherein the multi-level extensibility framework server generates an "end-to-end" intelligent extension proposal from the enterprise portal design system layer to the ERP solution layer.

12. The method of claim 10, wherein the multi-level extensibility framework server receives from the user adjustments to the intelligent extension proposal.

13. The method of claim 10, wherein the multi-level extensibility framework server includes an extensibility proposer framework to read field extensions and associated tables via an exposed Application Programming Interface ("API").

14. The method of claim 10, wherein the multi-level extensibility framework server includes an extensibility generator framework to determine intra and inter layer data mapping.

15. A non-transitory, computer readable medium having executable instructions stored therein to perform a method to facilitate extensibility for an enterprise portal, the method comprising:
providing, by a computer processor of a multi-level extensibility framework server, an extensibility relationship framework to extract metadata from the multiple technical layers, including an enterprise portal design system layer, a cloud application programming model layer framework, a cloud integration layer, and an Enterprise Resource Planning ("ERP") solution layer, the metadata being associated with existing artifacts and mappings, wherein the extensibility relationship framework includes a metadata reader, a metadata parser, and a relationship builder;
providing, by the computer processor of the multi-level extensibility framework server to a user, a graphical view of existing services of the enterprise portal using information from a business enterprise portal data store, containing information about the enterprise portal for the multiple technical layers of a cloud computing environment and a sample data model;
receiving from the user extension information for at least one of the technical layers;
based on the received extension information, automatically generating and providing an intelligent extension proposal to the user based on information from the extensibility relationship framework;
displaying simulated results to the user based on the intelligent extension proposal and the sample data model; and
receiving from the user a confirmation of the intelligent extension proposal and automatically transferring extension fields, entities, and mapping to the multiple technical layers of the enterprise portal.

16. The medium of claim 15, wherein the extensibility relationship framework provides extensibility in a Representational State Transfer ("REST") Advanced Business Application Programming ("ABAP") Programming ("RAP") model for on-premises applications.

17. The medium of claim 16, wherein the extensibility relationship framework provides extensibility in User Interface ("UP") elements.

18. The medium of claim 17, wherein the extensibility relationship framework provides extensibility in a Cloud Application Programming ("CAP") model for cloud-native applications.

19. The medium of claim 18, wherein the extensibility relationship framework provides extensibility in a cloud integration suite.

* * * * *